May 20, 1969 C. L. SEEFLUTH 3,445,096

THERMOPLASTIC PARISON HEATING

Filed July 18, 1966

INVENTOR
C.L. SEEFLUTH
BY Young & Quigg
ATTORNEYS

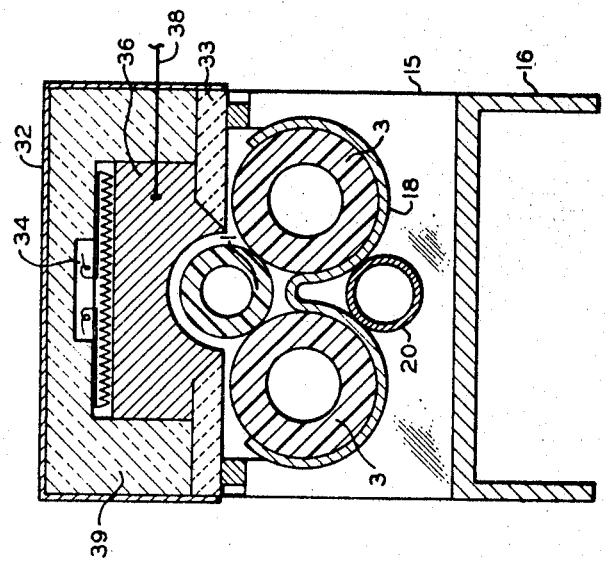
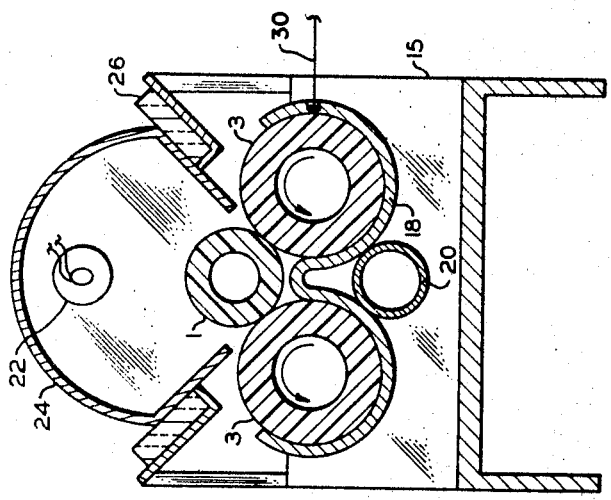

United States Patent Office 3,445,096
Patented May 20, 1969

3,445,096
THERMOPLASTIC PARISON HEATING
Charles L. Seefluth, Bartlesville, Okla., assignor to Phillips Petroleum Company, a corporation of Delaware
Filed July 18, 1966, Ser. No. 565,871
Int. Cl. F27b 9/06, 9/40; F27d 11/00
U.S. Cl. 263—3  8 Claims

ABSTRACT OF THE DISCLOSURE

Tubular thermoplastic parisons are heated to a predetermined temperature for orientation by alternately passing the parisons between a heating zone and a constant temperature zone maintained at a temperature just below the melting point of the parisons wherein the heat is distributed evenly throughout the parison.

---

Figure 1:
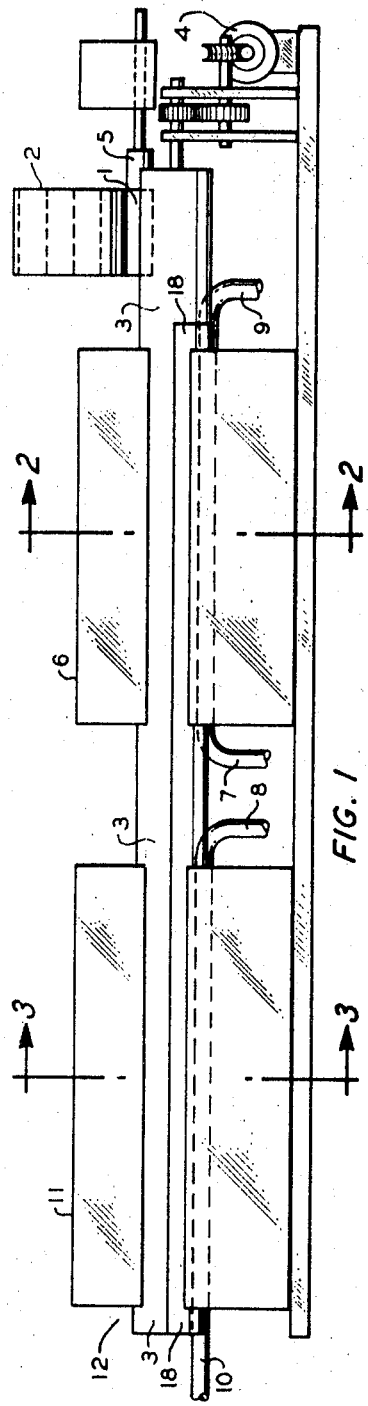

This invention relates to heating parisons. In one of its aspects it relates to a method for heating tubular parisons by applying radiant heat and maintaining substantially constant the temperature of the surface of the parison. In another aspect, the invention relates to an apparatus for heating a tubular parison wherein there is provided a radiant heat source, and a means to maintain the temperature of the parison surface substantially constant.

It is known to heat tubular parisons prior to blow molding and forming. The procedure involves extruding a parison, cooling the parison, then reheating the parison into a selected orientation temperature range and biaxially orienting the parison. It has been found with this procedure that improved biaxially oriented products result.

Thin wall parisons provide little or no problem in heating to the orientation temperature. However, as the thickness of the parison increases, it becomes increasingly difficult to uniformly heat the parison without melting the surface layer. Oftentimes in thermoplastic polymers, the heat transfer characteristics are low. Thus, a higher temperature need be used, or longer times need be used, to raise the parison to the orientation temperature.

I have now discovered that the heating process in thicker parisons can be substantially improved by using a relatively high heat source which maintains a constant heat flux across a heating zone, and maintains the temperature of the surface of the parison below the melting point of the parison. By this method, the parison is brought up to orientation temperature rather quickly without the undesirable melting of the parison's outer surface.

By various aspects of this invention, one or more of the following or other objects can be obtained.

It is an object of this invention to provide a method and apparatus for uniformly heating parisons.

It is a further object of this invention to provide a method and apparatus for temperature conditioning parisons for subsequent biaxial orientation wherein the surface of the parison is maintained at a temperature below the melting point of the parison although the heat in the heating zone can be sufficient to heat the parison above the melting point.

It is a still further object of this invention to control a parison heater so that a constant heat flux is maintained across the heating zone.

Other aspects, objects, and the several advantages of this invention are apparent to one skilled in the art from a study of this disclosure, the drawings and the appended claims.

According to the invention, a parison, preferably thermoplastic tubular parison, is passed into a heating zone wherein it is subjected to heat. There is also provided a constant temperature zone in which the temperature is maintained below the melting point characteristic of the parison. Each area of the parison is alternately, and preferably continuously, subjected to the heating zone and the constant temperature zone until the parison is brought up to an orientation temperature. One or more chambers containing heating and constant temperature zones can be provided.

In one aspect of the invention, coolant, such as water, at a constant temperature is used to maintain the temperature constant in the constant temperature zone, the temperature in the constant temperature zone is sensed and the amount of water at a predetermined temperature supplied to the constant temperature zone is adjusted in accordance with the temperature sensed to maintain a constant temperature in the constant temperature zone.

In accordance with another embodiment of the invention, the temperature is sensed in the constant temperature zone and the amount of heat supplied to the heating zone is controlled in accordance with the sensed temperature in the constant temperature zone to maintain a constant heat flux from the heating zone to the constant temperature zone.

In accordance with still another embodiment of the invention, the parison is a tubular parison and is radiantly heated in the heating zone. Further, the heating zone is in vertical relationship with the constant temperature zone and the tubular parison is rotated horizontally and axially between the heating zone and the constant temperature zone.

In another embodiment of the invention, parallel rollers, preferably made from tetrafluoroethylene, are used to rotate the tubular parison between the heating zone and the constant temperature zone.

In a still further embodiment of the invention, there is provided a means for passing the tubular parison to the temperature conditioning zone which is composed of the heating zone and the constant temperature zone, a means for advancing the parison through the constant temperature zone and a means for removing the parison from the temperature conditioning zone.

In a still further embodiment of the invention, the parison is fed to a first temperature conditioning zone containing a heating zone and a constant temperature zone, in which zone the heating is supplied by a radiant heater and the parison is then passed to a second heating zone which contains a solid block heater at a lower temperature. In the first temperature conditioning zone, the parison is subjected to higher heat and upon leaving the first temperature conditioning zone, there is a temperature gradient in the parison. In the second temperature conditioning zone, the parison is soaked at the proper temperature to provide an even distribution of heat throughout the parison thickness.

Figure 4:
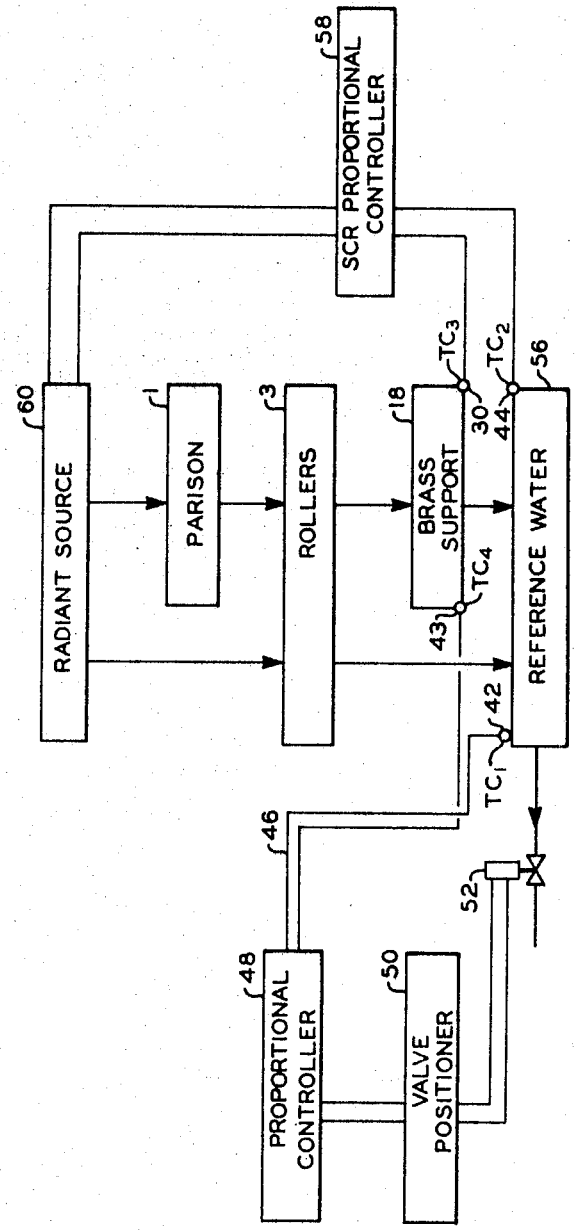

The invention will now be described with reference to the accompanying drawings in which FIGURE 1 is a schematic view of the operation of heating a tubular parison employing a first and second temperature conditioning means; FIGURE 2 is a cross section through 2—2 of FIGURE 1 showing the first temperature conditioning means; FIGURE 3 is a sectional view through line 3—3 of FIGURE 1 showing the second temperature conditioning zone; and FIGURE 4 is a schematic showing a control system of the invention.

Referring now to the drawings, tubular parisons 1 are fed from a tubular parison hopper 2 onto a pair of rotating rollers 3. The rollers are preferably made of Teflon, but can be made of any suitable material, preferably one to which the parison will not stick when it has been heated. The rollers are driven by a drive means 4. The parisons are pushed into the first temperature conditioning means 6 by parison pusher 5 as can be seen from the drawings. There will be a continuous supply of parisons moving through the parison heaters. The movement through the temperature conditioners will be caused by parison pusher 5 pushing subsequent parisons 1 into the first temperature conditioner 6. Suitable means 7 and 8 are provided to supply cooling fluid, preferably water, to parison temperature conditioner 6 and parison temperature conditioner 11 to cool the rollers 3, as will be hereinafter described. The cooling fluid is removed by lines 9 and 10. The fluid can be any suitable cooling material such as water, alcohol, and other organic or inorganic fluids. The cooling fluid can also be an inert gas. The parisons are removed from the exit end 12 of temperature conditioner 11 and are then suitable for a blow molding operation or other biaxially orienting operation.

Referring now to FIGURE 2, there is provided suitable support means 16 which is in the nature of a channel frame which supports the housing 15 for parison temperature conditioner 6. A pair of C-shaped cooling tubes 18 which directly contact rollers 3 are provided. Cooling water to tubes 18 is provided through tubing 20. A thermocouple 30 can be provided for controlling the temperature of the parison surface as will be hereinafter described. At the top of housing 15, there is supported a semi-circular reflector 24 which reflects radiant heat from radiant heater 22 to parison 1. Suitable refractory and insulating means 26 are provided to insulate the reflector 24 from the frame and other parts of the temperature conditioner.

As the parison passes through temperature conditioner 6, it is rotated by the rotation of rollers 3 in the direction of the arrows. It is obvious that the rollers could rotate in the opposite direction. A parison 1 is heated from the radiant heat supplied by radiant rod 22. As the parison rotates, it contacts rollers 3 which are maintained at a constant temperature by tubes 18. The contact of rollers 3 with the surface of parison 1 will cool the surface down to a temperature which is below the melting point of the material from which the parison is made. The fluid temperature in tube 20 is maintained such that the surface of the parison will not melt due to its contact with the rollers 3, but yet high enough so that the parison can be heated quickly to the orientation temperature.

Referring now to FIGURE 3 wherein the same numerals have been used for elements which are the same as in FIGURE 2, temperature conditioner 11 is similar to temperature conditioner 6, except that it contains a different heating means. Strip heater 34 supplies heat to an aluminum block 36 which transfers heat from the strip heater 34 to parison 1. As is understood by one skilled in the art, the aluminum block will maintain a substantially constant temperature and will be operated at a lower temperature than the radiant rod 22 of temperature conditioner 6. Of course, other types of material can be used in place of the aluminum in block 36. For example, copper, steel, cast iron, or any other reasonable conductor of heat can be used. The aluminum block 36 is surrounded by glass wool 39 and protected by a cover 32. Hard insulation 33 also protects the constant temperature section from the heat in heating block 36. There is also provided a thermocouple 38 which senses the temperature in heating block 36 and in accordance with the sensed temperature causes more or less heat to be supplied by strip heater 34.

When the parison is in temperature conditioner 11, it is subjected to a somewhat lower heat in heating block 36. In this temperature conditioner, the heat in the walls of the parison is equalized and brought up to the final orientation temperature.

Referring now to FIGURE 4, a thermocouple or other thermal sensing means 42 senses the temperature of water in 56 which maintains the temperature of tubes 18 substantially constant. A signal representative of the temperature is transmitted through 46 to proportional controller 48 which operates valve position 50 to open valve 52 which controls the supply of water to 56. By adjusting the amount of water supplied to 56 by the aforementioned system, the temperature of the water or other fluid in 56 can be maintained substantially constant.

The temperature control system employing temperature sensing means 42, a temperature sensing means 43 can be used to control the amount of cooling water supplied to 56 by sending a signal to proportional controller 48 which in turn sends a signal to valve position 50 which adjusts valve 52.

Proportional controller 48, valve positioner 50 and valve 52 can be electrically or pneumatically operated. A suitable pneumatic system would include a Taylor Instrument Transaire Transmitter Model 2, range 0–100° F., range limit 0–300° F., supplying pressure at 20 p.s.i., output pressure 3–15 p.s.i.; Taylor Transcope Recorder Serial C92JF741–604 and Hoke needle valve with 0.086 inch orifice having a spring loaded pneumatic diaphragm.

The cooling water control system can alternately employ a suitable electronic analog controller with an omnielectric valve actuator such as manufactured by George W. Dahl Company, Inc., 86 Tupelo Street, Bristol, R.I.

A second thermocouple 44 also senses the temperature of the water in 56 and relates the same to proportional controller 58 which in accordance therewith will control the temperature of the radiant source 60 to maintain a constant heat flux from the radiant source 60 to the Teflon rollers 3. This last mentioned control system is very useful in the warm-up of the operation before the parisons have been passed therethrough. Once the proper heat balance has been set up, the amount of heat supplied by radiant source 60 is maintained substantially constant. Alternately, a third thermocouple or similar sensing means 30 senses the temperature in the tubing 18 and relates the same to proportional controller 58. In the event that the temperaure in the tubing 18 becomes too low or too high, the proportional controller during the operation can adjust the heat supplied by the radiant source 60 to maintain a proper balance.

In the preferred operation of the invention, once the conditioner has the proper heat flux, the heat input from the radiant source 60 will be maintained substantially constant. The temperature will be controlled by supplying more or less fluid at a constant temperature to 56 through line 54. The temperature is maintained as has been hereinbefore described by thermocouple 42, proportional controller 48, motor 50 and valve 52.

Proportional controller 58 can be a silicon controlled rectifier controller system such as an API Temperature Controller Model 1602–L with 0–500° F. range, I-C thermocouple, a 915 module SCR driver, and two Westinghouse 2N688 SCR's each mounted in a Wakefield NC42IK Heat Sink.

The constant temperature fluid in 56 can be either in tubing 18 or fluid supply tube 20 or in rollers 3. Further, the thermocouples can measure the temperature within rollers 3. Still further, thermocouples 30, 44, and 42 can all be the same thermocouple supplying information to both controller 48 and controller 58.

The reference temperature maintained by thermocouple 42 is higher than the maximum cooling fluid temperature and sufficiently low to attract as much radiation as the parison can absorb without surface melting.

Whereas the invention has been described with reference to certain embodiments, it is obvious that other means can be used without departing from the spirit of the invention. For example, rollers 3 could be inclined downwardly and vibrated when rotated so as to cause the parisons 1 to move through both temperature conditioners without the use of parison pusher 5.

The parisons to which the invention is suitable include all types of thermoplastic polymers, preferably those which can be biaxially oriented upon heating into a particular temperature range. Those polymers from monomers having a vinyl or vinylidene linkage, 1-olefins such as ethylene, propylene, butylene and copolymers thereof, are suitable.

The invention can be further exemplified by the following specific example.

Example

A parison temperature conditioning apparatus according to the invention has been constructed with the following characteristics:

| | |
|---|---|
| Length of temperature conditioning zones ___feet__ | 6 |
| Length of radiant heating zone _____do____ | 4 |
| Length of heating block zone _____do____ | 2 |
| Temperature of radiant heating elements (max.) _____F__ | 1800 |
| Temperature of heating block _____F__ | 500 |
| Time required to pass through both heating zones and heat to final temperature _____minutes__ | 5 |
| Final temperature of parison _____F__ | 330 |
| Cooling water flow rate _____gallons per hour__ | 2 |
| Size of parison _____ | (¹) |

¹ 0.850 in O.D. x 0.21 in wall x 3¼ inches long.

Whereas rollers 3 have been described as tubular in shape, it is obvious that rollers 3 could be solid in cross section and made out of a non-sticking material for the parison or can be coated with a non-sticking material for the parison such as polytetrafluoroethylene.

Reasonable variation and modification are possible within the scope of the foregoing disclosure and the drawing without departing from the scope of the invention.

I claim:

1. A method for heating a tubular thermoplastic parison to a predetermined temperature for orientation, said method comprising passing said parison to a temperature conditioning zone having a heating zone and a constant temperature zone in which the temperature is maintained below the melting point of said parison, alternately contacting each area of said parison surface with said heating zone and said constant temperature zone so that said parison evenly heats to an orientation temperature.

2. A method for heating a tubular thermoplastic parison according to claim 1 wherein fluid at a constant temperature is used to maintain the temperature in said constant temperature zone, the temperature in said constant temperature zone is sensed and the amount of fluid supplied to said constant temperature zone is adjusted in accordance with the temperature sensed to maintain a constant temperature in said constant temperature zone.

3. A method for heating a tubular thermoplastic parison according to claim 1 wherein the temperature in said constant temperature zone is sensed and the amount of heat supplied to the heating zone is controlled in accordance with the sensed temperature to maintain a constant heat flux from said heat zone to said constant temperature zone.

4. A method for heating a tubular thermoplastic parison according to claim 1 wherein the parison is radiantly heated in said heating zone.

5. A method for heating a thermoplastic parison according to claim 1 wherein said heating zone is in vertical relationship to said constant temperature zone and said parison is rotated horizontally and axially between said heating zone and said constant temperature zone.

6. A method according to claim 1 wherein said temperature conditioning zone comprises a first zone and a second zone and a parison is passed from the first zone to the second zone, in said first zone subjecting said parison to radiant heat and in said second zone subjecting said parison to heat from a heating block maintained at a lower temperature than the radiant heat of said first zone.

7. An apparatus for temperature conditioning a thermoplastic parison comprising heating means, means to supply heat to said heating means, constant temperature means which is adapted to maintain a temperature below the melting point of said parison, means to supply fluid at a constant temperature to said constant temperature means, means to alternately transfer each area of said parison surface from exposure to said heating means and said constant temperature means, means to sense the temperature in said constant temperature means, means to adjust at least one of said means to supply heat to said heating means, and means to supply constant temperature fluid to said constant temperature means.

8. An apparatus according to claim 7 wherein said heating means comprises a heated metal block which semi-circumferentially envelops said parison, said metal block being composed of a heat conductive material, and there is provided a means to supply heat to said metal block.

References Cited

UNITED STATES PATENTS

| | | | |
|---|---|---|---|
| 2,635,733 | 4/1953 | Reichl | 263—3 |
| 2,839,282 | 6/1958 | Bloom | 263—3 |
| 2,998,966 | 9/1961 | Knight | 263—3 |
| 3,256,002 | 6/1966 | Hudson | 263—3 |

JOHN J. CAMBY, Primary Examiner.

U.S. Cl. X.R.

219—388